UNITED STATES PATENT OFFICE.

BERNARD DIAMAND, OF IDAWEICHE, OBERSCHLESIEU, GERMANY.

NEUTRALIZING SOLUTIONS OF SALTS.

938,128. Specification of Letters Patent. Patented Oct. 26, 1909.

No Drawing. Application filed December 10, 1908. Serial No. 466,904.

*To all whom it may concern:*

Be it known that I, BERNARD DIAMAND, doctor of philosophy, chemist, a citizen of Austria-Hungary, residing at Idaweiche, Oberschlesieu, Germany, have invented new and useful Improvements in Neutralizing Solutions of Salts, of which the following is a specification.

The present invention relates to a process of neutralizing solutions of salts for wood preserving.

It is already known that many salts in aqueous solution give off acid and form basic salts. Particularly the salts of the heavy metals which find manifold applications in many industries, display this property to a degree which prevents their use, or at any rate limits it for many purposes. Thus, for instance, various metallic salts would be specially suitable for protecting wood against combustion and at the same time against the action of organic wood destroyers, if the acid set free in the aqueous solution did not itself act as a destroyer of the wood. As the impregnation of the wood is undertaken mostly at a temperature of about 60° centigrade, and with a rise of temperature there is not only a correspondingly increased quantity of acid set free, but also its injurious action on the wood becomes a disproportionately greater one, the destruction of the wood thus caused exceeds mostly the preservative action of the salt and renders it unsuitable for this purpose. Manifold efforts have been made to obviate this drawback, as for instance by the admixture of salts of weaker acids, which are intended to neutralize the liberated stronger acid, but these have not led to the desired result. They fail partly because of adverse secondary reactions, and partly because during the neutralization process basic salts, hydrates or carbonates easily separate out (it is well known that on the addition of soda to the solutions of the heavy metal salts, a precipitation of their basic salts takes place). The neutralization can, however, be effected without the separation of precipitates if to the neutralizing reagent waste lye from the manufacture of sulfite-cellulose be added in requisite quantity.

In carrying out my process I may proceed as follows: I take the waste lye as furnished by the cellulose plants, that is to say, a pulp-like or cementlike dark-colored mass, and I dissolve the same in hot water sufficient to produce a solution the density of which amounts to 4–5° Bé. To this solution I add soda under constant stirring and with accompanying heating up to the boiling point, until a strongly alkaline reaction is attained. (The waste lye resulting from the sulfite cellulose process is generally of rather strong acidity, but in some cases the acidity is in the main neutralized by means of lime before putting the lye on the market.) According to the degree of acidity which is present I must add a greater or smaller quantity of soda. I take in the first place such a quantity of soda as is necessary to only neutralize the solution and then I add a further amount of soda, for instance 12 grams for each liter of liquid. The quantity of soda added beyond the point of neutralization depends upon the acidity of the salt solutions to be neutralized, which acidity may be previously tested. Any resulting precipitate may be filtered off. In order to produce an impregnation solution which is adapted for the preservation of wood, the metal salt solution is preferably prepared separately. For instance I dissolve in 100 parts of water:

Ferrous sulfate ____ 6 parts by weight
Aluminium sulfate _ 1 part by weight
Sodium fluorid_____ 1 part by weight To 100 liters of this solution, I add from 18 to 20 liters of the above mentioned alkalized solution of waste sulfite liquor.

In order to economize soda, slaked lime might first be used and then finally soda.

In this manner it becomes possible to produce aqueous solutions of the salts of the heavy and other metals, which react neutral or even alkaline, without having given or giving a precipitate. It is also possible to evaporate these solutions to dryness and to re-dissolve the mixture of salts thus obtained in the solid form, without causing the production of precipitates.

I claim:

1. The herein described process of neutralizing solutions of salts for wood preserving, which consists in adding an alkali to waste sulfite liquor, and mixing the resulting solution with sulfate of aluminium and sulfate of iron.

2. The herein described process of neutralizing solutions of salts for wood preserving, which consists in adding an alkali to waste sulfite liquor, and mixing the resulting solution with sulfate of aluminium, sulfate of iron, and fluorid of sodium.

3. The herein described process of neutralizing solutions of salts for wood preserving, which consists in adding lime and soda to waste sulfite liquor, mixing the resulting solution with sulfate of iron, sulfate of aluminium, and sodium fluorid, and evaporating the mixture to dryness.

In testimony whereof I have signed my name to this specification in the presence of two subscribing witnesses.

BERNARD DIAMAND.

Witnesses:
HENRY HASPER,
WOLDEMAR HAUPT.